(12) United States Patent
Narahara et al.

(10) Patent No.: US 10,183,705 B2
(45) Date of Patent: Jan. 22, 2019

(54) LOWER VEHICLE-BODY STRUCTURE OF VEHICLE

(71) Applicant: MAZDA MOTOR CORPORATION, Hiroshima (JP)

(72) Inventors: Takashi Narahara, Hiroshima (JP); Masaya Nishimoto, Aki-gun (JP); Takahiro Aonuma, Hiroshima (JP); Kazuto Ishii, Aki-gun (JP); Ken Fujimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 69 days.

(21) Appl. No.: 15/387,285

(22) Filed: Dec. 21, 2016

(65) Prior Publication Data
US 2017/0225718 A1 Aug. 10, 2017

(30) Foreign Application Priority Data
Feb. 4, 2016 (JP) .................................. 2016-019507

(51) Int. Cl.
*B62D 27/02* (2006.01)
*B62D 21/11* (2006.01)
(Continued)

(52) U.S. Cl.
CPC .............. *B62D 27/02* (2013.01); *B62D 21/11* (2013.01); *B62D 21/155* (2013.01);
(Continued)

(58) Field of Classification Search
CPC ....... B62D 27/02; B62D 21/11; B62D 21/155
(Continued)

(56) References Cited

U.S. PATENT DOCUMENTS 6,349,953 B1 * 2/2002 Yoshihira ................. B60G 7/02
   280/124.109
9,266,563 B1 * 2/2016 Han ....................... B62D 21/11
(Continued)

FOREIGN PATENT DOCUMENTS

JP    2011-162159 A    8/2011
JP    2012-153258 A    8/2012

OTHER PUBLICATIONS

An Office Action; "Notice of Reasons for Refusals," issued by the Japanese Patent Office dated Jan. 23, 2018, which corresponds to Japanese Patent Application No. 2016-019507 and is related to U.S. Appl. No. 15/387,285; with English language concise explanation.

*Primary Examiner* — Jason S Morrow
(74) *Attorney, Agent, or Firm* — Studebaker & Brackett PC

(57) ABSTRACT

In a lower vehicle-body structure of a vehicle which comprises a suspension cross member, a side member, and first and second reinforcing members which are provided in a closed cross section formed by the side member and a slant portion, the suspension cross member being fixed by fastening a bolt which is inserted through the suspension cross member to a weld nut which is vertically fixed to a bottom plate portion of the side member, the first reinforcing member is joined to a front-side semicircular portion of a peripheral portion of the weld nut and the second reinforcing member is joined to a rear-side semicircular portion of the peripheral portion of the weld nut.

11 Claims, 9 Drawing Sheets

(51) Int. Cl.
*B62D 21/15* (2006.01)
*B62D 27/04* (2006.01)
*B62D 25/08* (2006.01)

(52) U.S. Cl.
CPC ........... *B62D 25/082* (2013.01); *B62D 27/04* (2013.01); *B60Y 2306/01* (2013.01); *B60Y 2410/124* (2013.01)

(58) Field of Classification Search
USPC ............................................. 296/187.08, 204
See application file for complete search history.

(56) References Cited

U.S. PATENT DOCUMENTS

| | | | |
|---|---|---|---|
| 2011/0198832 A1* | 8/2011 | Takeshita | B62D 21/11 280/784 |
| 2012/0187724 A1 | 7/2012 | Tomozawa et al. | |
| 2014/0203543 A1* | 7/2014 | Onishi | B62D 21/155 280/784 |
| 2016/0016611 A1* | 1/2016 | Shirooka | B62D 21/11 296/187.09 |
| 2017/0247057 A1* | 8/2017 | Tatsuwaki | B62D 21/11 |

\* cited by examiner

US 10,183,705 B2

LOWER VEHICLE-BODY STRUCTURE OF VEHICLE

BACKGROUND OF THE INVENTION

The present invention relates to a lower vehicle-body structure of a vehicle, and in particular to the lower vehicle-body structure of the vehicle in which a suspension cross member is fixed by fastening a bolt member to a nut member vertically fixed to a bottom plate portion of a support member.

Conventionally, a pair of right-and-left front side frames provided at a front vehicle body of the vehicle are connected to a front-face side of a dash panel, and rear end portions of the front side frames extend rearward along a slant portion of the dash panel to the vicinity of a front end of a floor panel and are joined to the dash panel and the floor panel from a front side of a cabin. Herein, the front side frames are configured such that their midway portions are bent in a vehicle width direction in front of the dash panel in order to reduce a collision load for a passenger in a vehicle frontal collision, thereby reducing collision energy of the collision load through bending deformation of the front side frames.

Further, a suspension cross member to support suspension arms for a front wheel is arranged in back of and right below a power unit. A lower vehicle-body structure of a vehicle disclosed in Japanese Patent Laid-Open Publication No. 2011-162159 is configured such that the suspension cross member extending in the vehicle width direction is provided in back of and right below the power unit which is arranged between a pair of right-and-left front side frames extending forward from a front portion of a cabin, a rear end portion of the suspension cross member is supported at a support portion which is provided at a side member connecting to a front end portion of a tunnel frame, a midway portion of the suspension cross member is supported at the front side frame via a middle attaching member extending upward, and a lower portion of a pipe-shaped attaching member which forms an upper end side portion of the middle attaching member is supported, having a lower support rigidity, in the longitudinal direction, than an inward portion, in the vehicle width direction, a front portion, and a rear portion of a side face portion.

As shown in FIG. 9, a rear-end side support portion of a suspension cross member 54 disclosed in the above-described patent document is provided with a reinforcing member 52 and a weld nut 53 inserted into the reinforcing member which are both arranged in a closed cross section formed by a dash panel 50 and a side member 51, and a bolt 55 inserted through a rear end portion of the suspension cross member 54 is fastened to the weld nut 53. When the suspension cross member 54 is moved back in a vehicle frontal collision, rotational movement is generated at the bolt 55 so that a lower end of the bolt 55 can be rotated rearward and upward (counterclockwise). Herein, a front-side lower end portion of the weld nut 53 is pressed against a front-side peripheral area of a bolt hole formed at a bottom plate portion 51a of the side member 51, which causes local stress concentration so that the bolt hole may be deformed, enlarged, or tear off. Consequently, the weld nut 53 may be pulled off the side member 51, whereby the rear end portion of the suspension cross member 54 may be detached from a vehicle body.

In a case where the performance of absorbing the collision energy by the front side frame is high, it is necessary to promptly detach the suspension cross member from the vehicle body in the vehicle frontal collision so that the collision-energy absorption performance of the front side frame can be maintained properly. However, there is room for further improvement in attaining the collision-energy absorption more stably.

SUMMARY OF THE INVENTION

An object of the present invention is to provide a lower vehicle-body structure of a vehicle which can improve the collision-energy absorption performance.

The present invention is a lower vehicle-body structure of a vehicle, which comprises a suspension cross member extending in a vehicle width direction and a support member fixed to a vehicle-body lower portion of a vehicle body, the suspension cross member being fixed to the support member by fastening a bolt member inserted through the suspension cross member to a nut member vertically fixed to a bottom plate portion of the support member, wherein a first reinforcing member which is supported at the support member is provided, and the first reinforcing member is joined to a portion of a peripheral portion of the nut member which is positioned on an opposite side to a cabin.

According to the present lower vehicle-body structure, since the first reinforcing member is joined to the specified portion of the peripheral portion of the nut member which is positioned on the opposite side to the cabin, when the collision load directed toward the cabin side acts on the suspension cross member in the vehicle collision, a reaction force acting in a compressive direction to suppress a rotation of the bolt member can be generated, preventing a positional shift of the nut member relative to the first reinforcing member. Thereby, any local stress concentration can be prevented from occurring at the bottom plate portion of the support member, so that the timing of detachment of the suspension cross member from the vehicle body can be delayed properly, thereby making crush (collapsing) deformation of the suspension cross member contribute to the collision-energy absorption performance.

In an embodiment of the present invention, a second reinforcing member is provided in a closed cross section which is formed by the support member and the vehicle-body lower portion, and the second reinforcing member is joined to a portion of the peripheral portion of the nut member which is different from the portion to which the first reinforcing member is joined.

According to this structure, the rotation of the bolt member can be suppressed by the first reinforcing member and the second reinforcing member.

In another embodiment of the present invention, the second reinforcing member is connected to the first reinforcing member, the first reinforcing member is joined to a semicircular portion of the peripheral portion of the nut member which is positioned on the opposite side to the cabin, and the second reinforcing member is joined to a semicircular portion of the peripheral portion of the nut member which is positioned on a side of the cabin.

According to this structure, the reaction (force) acting in the compressive direction to suppress the rotation of the bolt member can be increased.

In another embodiment of the present invention, the first reinforcing member comprises a first lateral wall portion arranged roughly horizontally, a second lateral wall portion arranged substantially in parallel to the first lateral wall portion, and a vertical wall portion connecting respective end portions of the first and second lateral wall portions which are positioned on the opposite side to the cabin, and an end portion of the first lateral wall portion which is positioned on the side of the cabin has a cutout to engage with a semicircular portion of the peripheral portion of the nut member which is positioned on the opposite side to the cabin.

According to this structure, since the collision load acting on the first lateral wall portion from the nut member is dispersed to the support member by way of the second lateral wall portion, the local stress concentration can be prevented from occurring at a seat area of the nut member.

Other features, aspects, and advantages of the present invention will become apparent from the following description which refers to the accompanying drawings.

DETAILED DESCRIPTION OF THE INVENTION

Figure 1:
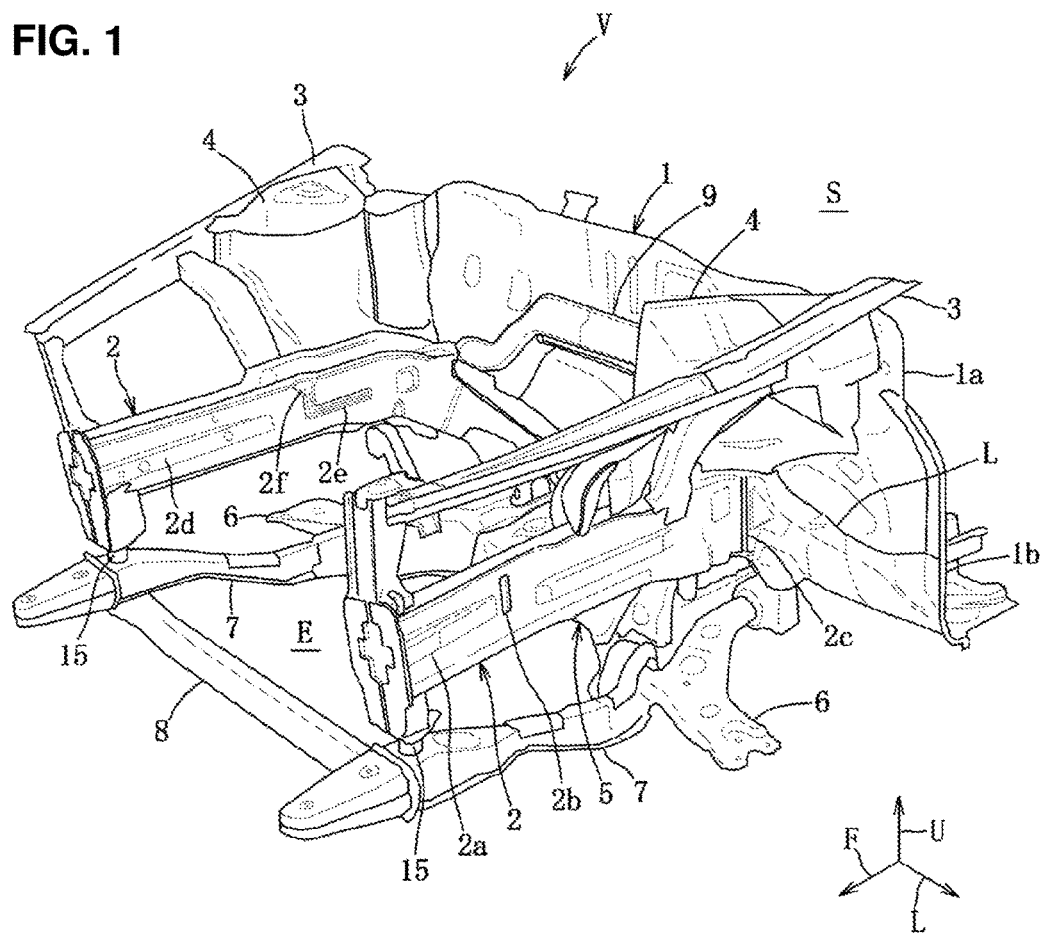
FIG. 1 is a perspective view of a lower vehicle-body structure of a vehicle according to an embodiment of the present invention.

The following descriptions exemplify the prevent invention which is applied to a lower vehicle-body structure of a vehicle, which should not limit the present invention, its applied object, or its use.

Hereinafter, an embodiment of the present invention will be described referring to FIGS. 1 through 8. As shown in FIGS. 1 through 4, a vehicle V comprises a dash panel 1 which longitudinally partitions an engine room E from a cabin S, a pair of right-and-left front side frames 2 which extend forward from the dash panel 1, a pair of apron reinforcement 3 which are respectively provided above and on an outward side, in a vehicle width direction, of the pair of front side frames 2, a pair of cylindrical suspension towers 4 which are respectively arranged closely to the dash panel 1 between the front side frames 2 and the apron reinforcements 3, and others. Herein, a direction shown by an arrow F means a vehicle forward direction, a direction shown by an arrow L means a vehicle leftward direction, and a direction shown by an arrow U means a vehicle upward direction.

Further, the vehicle V comprises a suspension cross member 5 which is arranged at an lower portion of the engine room E and extends laterally, a pair of right-and-left suspension arms 6 which are arranged on both right-and-left sides of the suspension cross member 5, a pair of right-and-left engine support members 7 which extend longitudinally, a front cross member 8 which extends between respective front end portions of the pair of engine support members 7, and others. The front end portions of the engine support members 7 are connected to respective front ends of the front side frames 2 via rubber mounts 15. Both right-and-left end portions of the front cross member 8 are fixed to the respective rubber mounts 15, interposing the engine support members 7.

Figure 2:
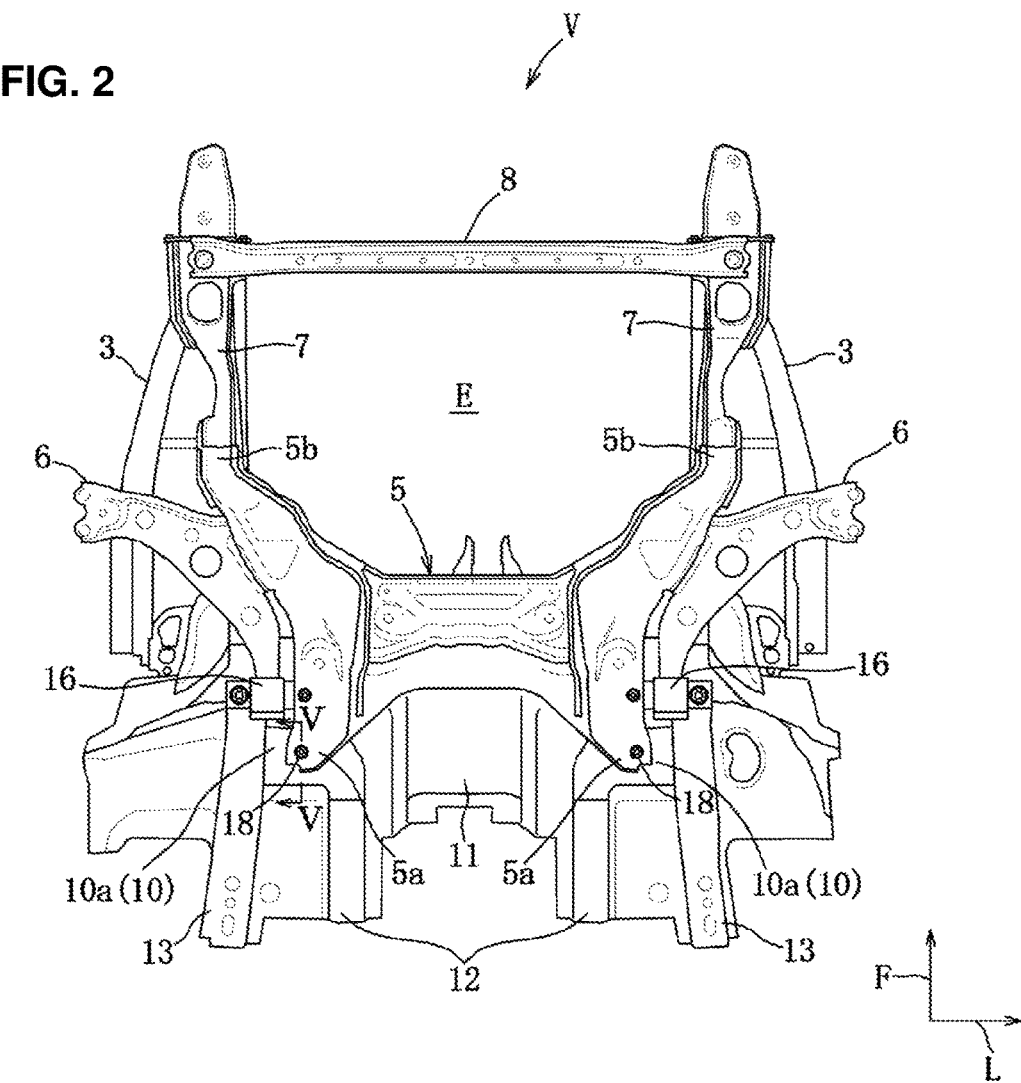
FIG. 2 is a bottom view.
Figure 4:
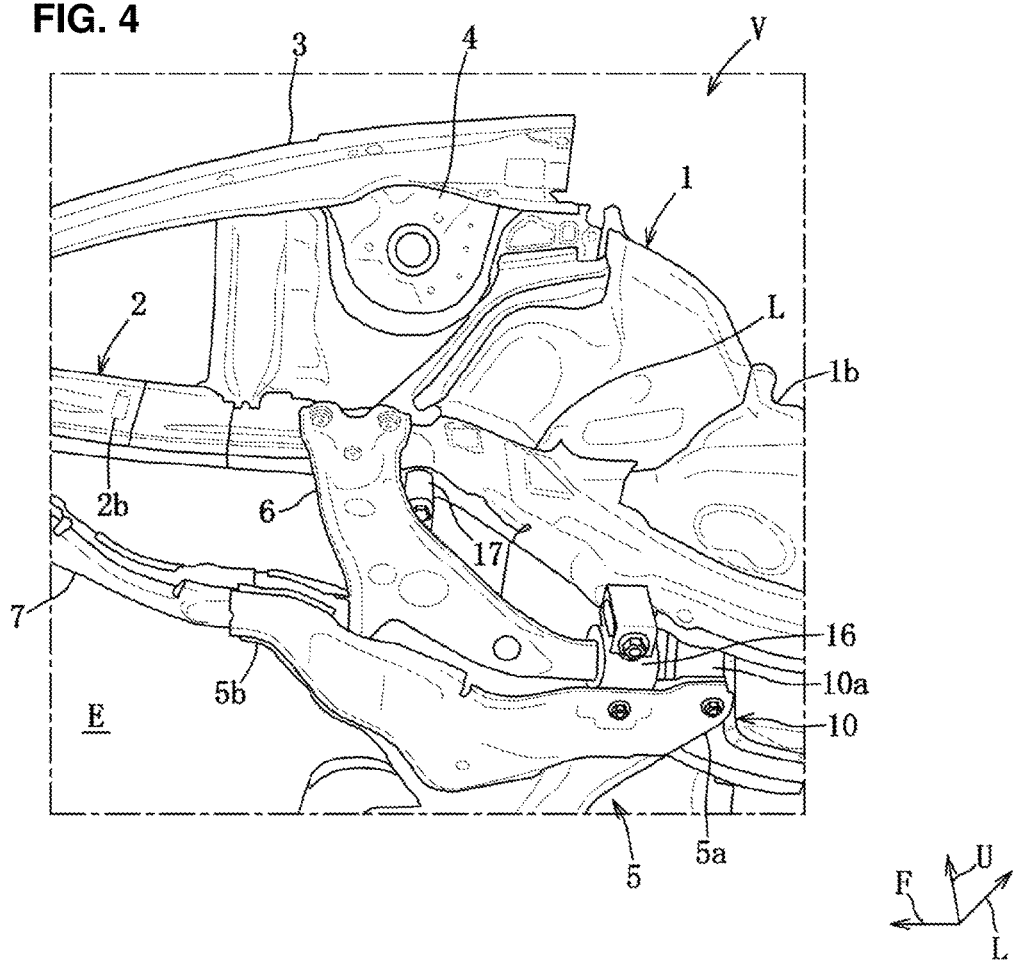
FIG. 4 is a perspective view, when viewed from a leftward-and-downward side.
Figure 5:
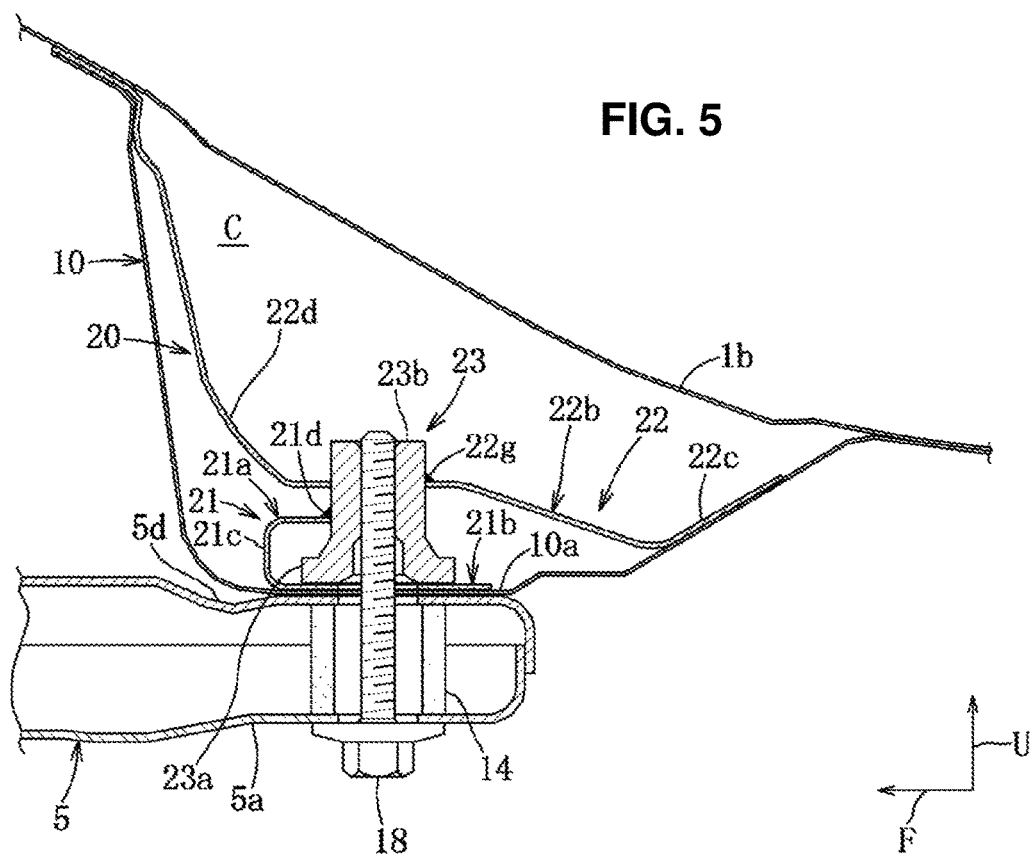
FIG. 5 is a sectional view taken along line V-V of FIG. 2.
Figure 6:
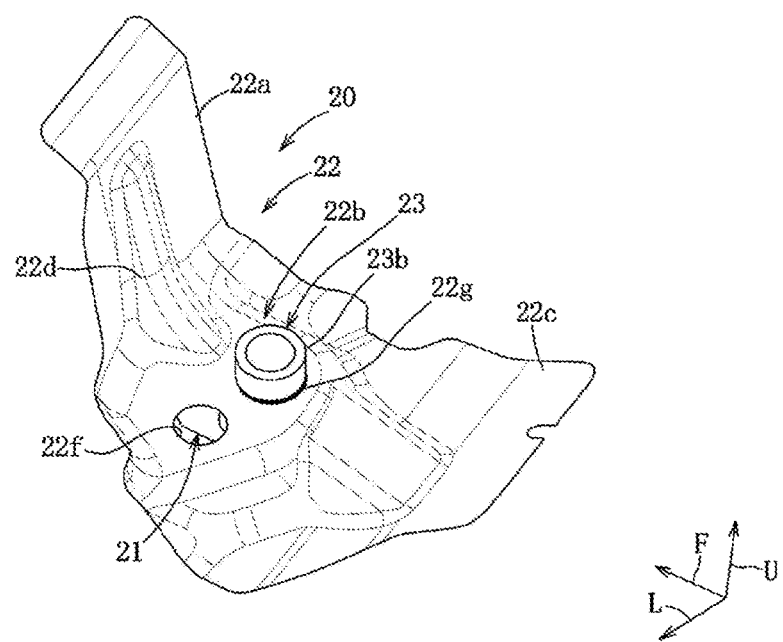
FIG. 6 is a perspective view of a nut unit, when viewed from a leftward-and-upward side.
Figure 7:
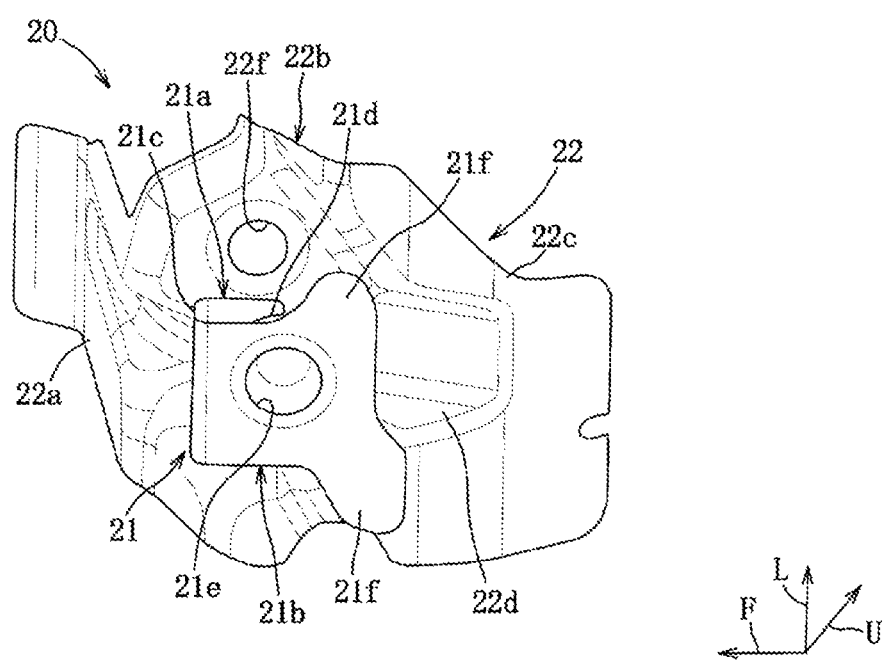
FIG. 7 is a perspective view, when viewed from the leftward-and-downward side.
Figure 8:
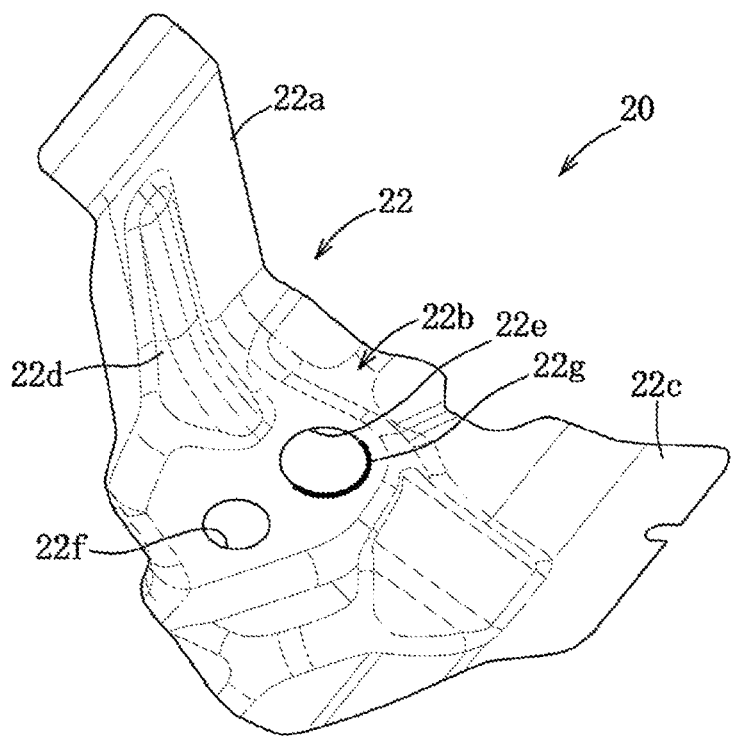
FIG. 8 is an exploded perspective view of the nut unit.
Figure 8:
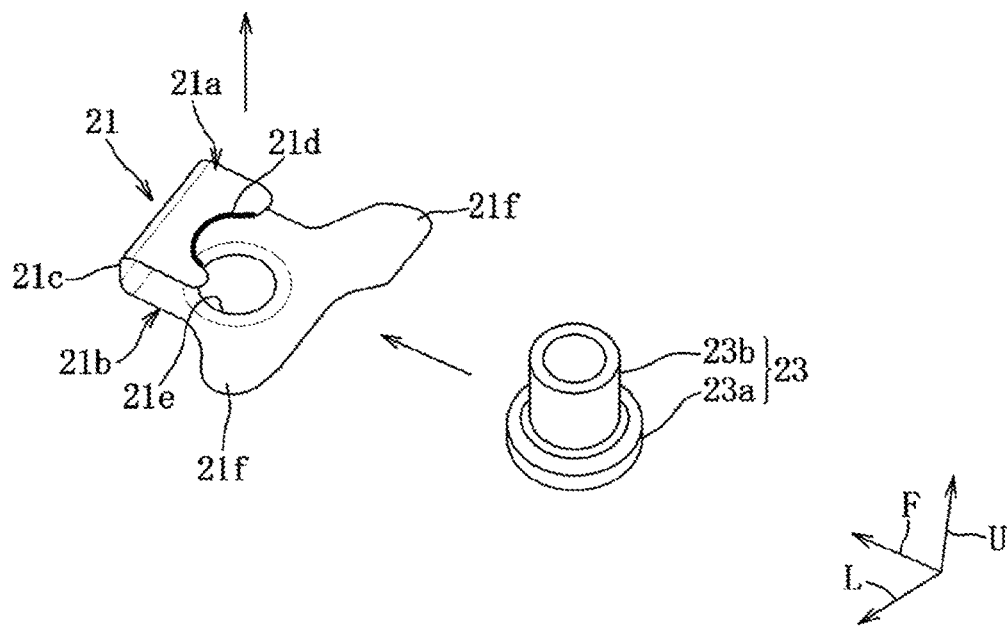
Figure 9:
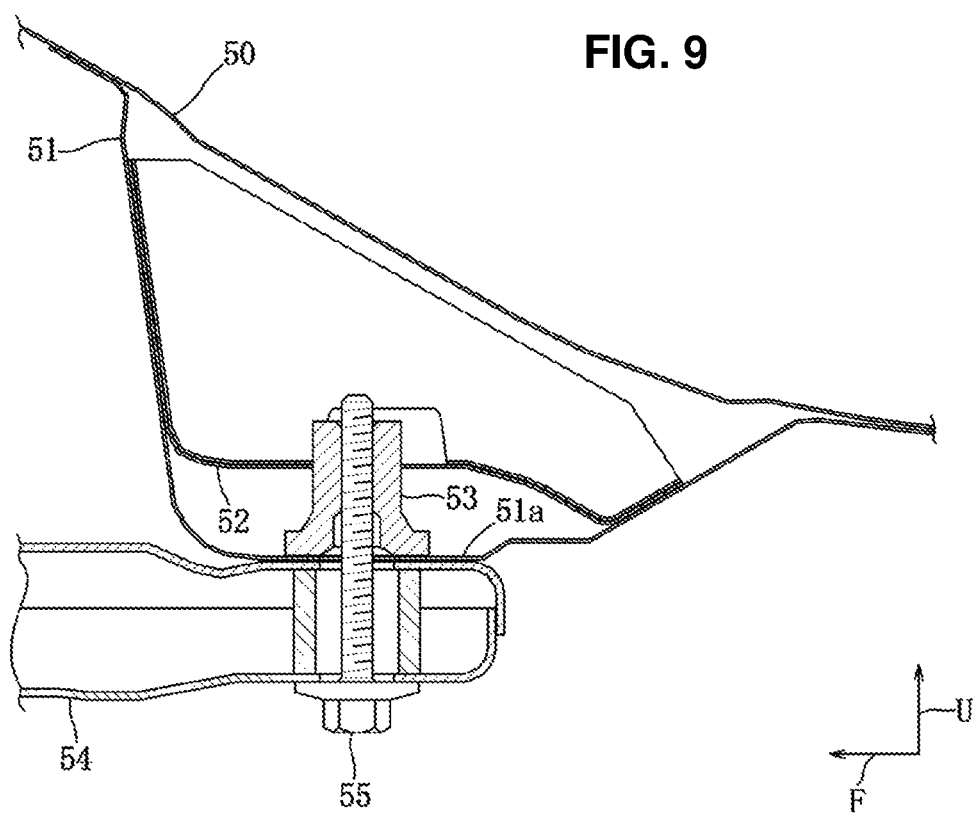
FIG. 9 is a vertical sectional view of a rear-end side support portion of a suspension cross member according to a conventional structure (prior art).

As shown in FIGS. 2 and 4, each of the pair of right-and-left side members 10 (support members) is configured in a roughly L shape such that it interconnects a front end portion of each of a pair of right-and-left tunnel frames 12 which are arranged on respective outward sides, in the vehicle width direction, of a tunnel portion 11 formed at a central portion of the vehicle V and extend longitudinally and a front end portion of each of a pair of right-and-left floor frames 13 which are arranged on respective outward sides, in the vehicle width direction, of the pair of tunnel frames 12 and extend longitudinally. Each of the pair of side members 10 includes a roughly-horizontal bottom plate portion 10a which is capable of face-contacting an upper face of an attachment face portion 5a, which will be described later, and a bolt hole which penetrates the bottom plate portion 10a. As shown in FIG. 5, each front-end side portion of the pair of the side members 10 which extends laterally is joined to a lower face of a slant portion 1b by welding, and forms a closed cross section C together with the slant portion 1b.

The dash panel 1 is made of a steel plate which is relatively thin and has a relatively low rigidity, compared to the front side frame 2 and others. As shown in FIGS. 1, 3-5, the dash panel 1 comprises a vertical wall portion 1a which extends vertically at a front end portion of the cabin S and a slant portion 1b which extends obliquely rearward and downward from a lower edge of the vertical wall portion 1a. A lower end portion of the vertical wall portion 1a and an upper end portion of the slant portion 1b are joined together by spot welding. A rear end portion of the slant portion 1b is joined to a front end portion of a floor panel (not illustrated). An upper end portion of the vertical wall portion 1a is joined to a cowl portion (not illustrated) which extends laterally, and both right-and-left end portions of the dash panel 1 are joined to respective front hinge pillars (not illustrated).

A dash cross member 9 which extends laterally and has a hat-shaped cross section is provided at a front face, on the side of the engine room E, of the dash panel 1 at a joint portion of the vertical wall portion 1a and the slant portion 1b. The dash cross member 9 forms a closed cross section extending laterally together with the dash panel 1, thereby increasing the rigidity of the dash panel 1. Both right-and-left end portions of the dash cross member 9 are joined to respective joint portions L of the front side frames 2 and the dash panel 1, which will be described later, thereby increasing the support rigidity of the front side frames 2.

Next, the pair of right-and-left front side frames 2 will be described. As shown in FIG. 1, the pair of right-and-left front side frames 2 are arranged in front of the dash panel 1 partitioning a front end of the cabin S at right and left portions of the engine room E and extend longitudinally, interposing a power unit (not illustrated). The pair of front side frames 2 extend rearward roughly horizontally from a front-end side position of the vehicle V and are joined to the vertical wall portion 1a of the dash panel 1 at their rear-end side midway portions, and their rear-end side portions extend obliquely rearward and downward along the slant portion 1b and a lower face of the floor panel and then joined. The rear-end side portions of the front side frames 2 are joined to the dash panel 1 via the joint portions L. The pair of front side frames 2 are configured such that the left-side front side frame 2 and the right-side front side frame 2 are roughly symmetrical.

Figure 3:
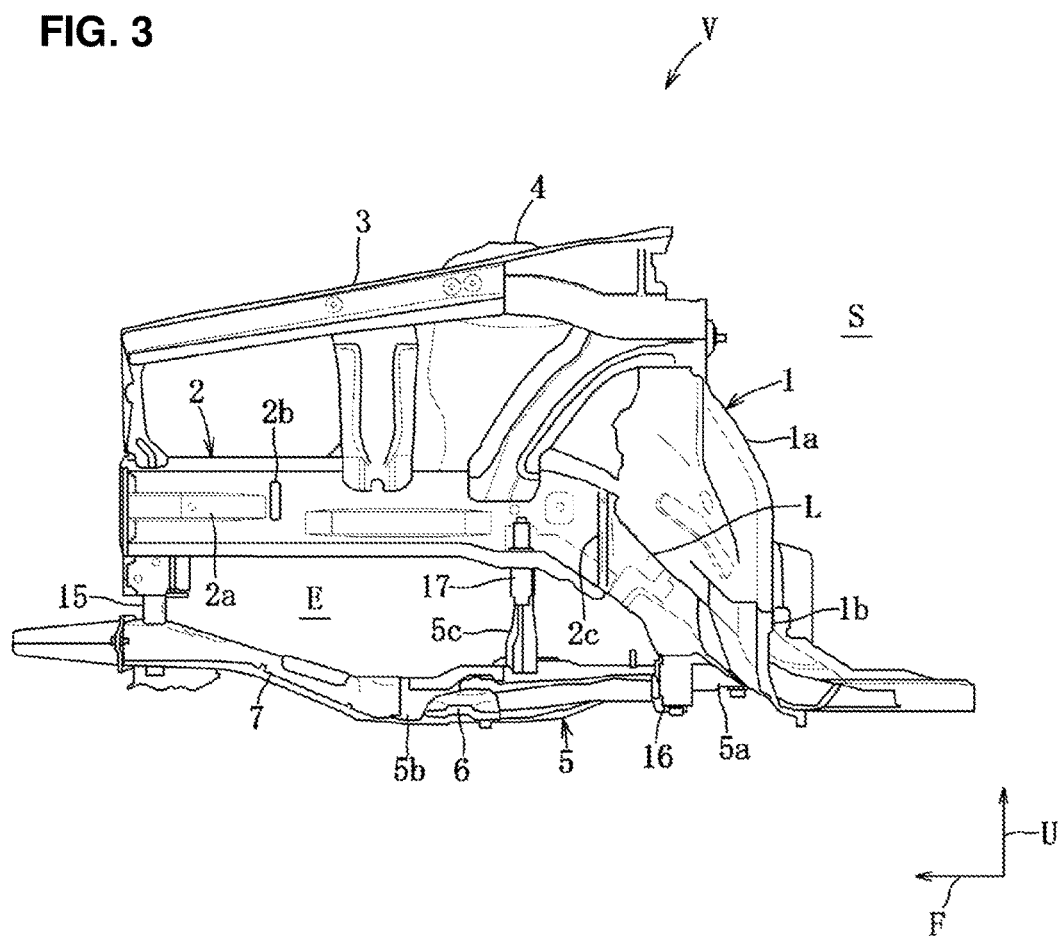
FIG. 3 is a side face view.

The front side frame 2 comprises an outer panel forming an outward-side half part which has a hat-shaped cross section and an inner panel forming an inward-side half part which has a hat-shaped cross section, which has a roughly rectangular-shaped cross section extending longitudinally. As shown in FIGS. 1, 3 and 4, at a side wall portion of the outer panel are formed an outer convex portion 2a, a first outer bead portion 2b which extends vertically, a second outer bead portion 2c which is arranged in back of the first outer bead portion 2b and extends vertically, and others, and at a side wall portion of the inner panel are formed an inner convex portion 2d, an inner concave portion 2e which extends longitudinally, an inner bead portion 2f which is provided between the first outer bead portion 2b and the second outer bead portion 2c and extends vertically, and others. Thereby, a collision load which has not been absorbed by crush (collapsing) deformation of a crash can (not illustrated) provided at a front end portion of the front side frame 2 in a vehicle frontal collision makes the first outer bead portion 2b and the second outer bead portion 2c have a valley-folding (bending) deformation, and makes the inner bead portion 2f have a ridge-folding (bending) deformation. Thus, the collision load is absorbed though zigzag-shaped deformation.

Next, the suspension cross member 5 will be described. As shown in FIGS. 1-5, the suspension cross member 5 is arranged below the power unit, and comprises an upper panel having a roughly U-shaped cross section and a lower panel having a roughly U-shaped cross section, which is configured in a roughly H shape in a plan view to have a closed cross section. The suspension cross member 5 forms a perimeter frame jointly with the engine support members 7 and the front cross member 8. The suspension cross member 5 comprises a pair of right-and-left attachment face portions 5a, a pair of right-and-left engine support attachment portions 5b, a pair of right-and-left middle attaching members 5c, and others.

The pair of engine support attachment portions 5b are configured to extend forward from both right-and-left end portions of the suspension cross member 5, respectively. The engine support members 7 are connected to respective front end portions of the pair of engine support attachment portions 5b at their rear end portions. The pair of middle attaching members 5c are configured as vertically-extending vertical members. These middle attaching members 5c are joined to respective midway portions, in the longitudinal direction, of both right-and-left end portions of the suspension cross member 5 at their lower end portions, and connected to the front side frames 2 via rubber bushes at their upper end portions. Respective rear end portions of the pair of suspension arms 6 are connected to rear-end side portions of the suspension cross member 5 via support brackets 16, and respective front end portions of the suspension arms 6 are connected to front-end side portions of the suspension cross member 6 via rubber mounts (not illustrated).

As shown in FIG. 5, concave bead portions 5d which extend laterally are formed at respective upper panels of the pair of attachment face portions 5a. Thereby, the suspension cross member 5 is configured to have downward bending deformation having a bending start point at the bead portions 5d in the vehicle frontal collision. Further, bolt holes into which bolts 18 (bolt members) are inserted vertically are formed at the pair of attachment face portions 5a, and collar members 14 which extend vertically are arranged in the closed cross section of the suspension cross member 5 at positions which correspond to the above-described bolt holes so that the bolts 18 can be inserted into the collar members 14 in a state where the bolts 18 are spaced apart from each other, having a specified distance between them. The pair of attachment face portions 5a are configured to protrude rearward respectively from both right-and-left end portions of the suspension cross member 5. These attachment face portions 5a are fixedly fastened to the pair of side members 10 with the bolts 18, respectively.

In the closed cross section C of each of the side members 10 is arranged a nut unit 20 which is supported at the side member 10 and connected to the bolt 18. As shown in FIGS. 5-8, the nut unit 20 comprises a first reinforcing member 21, a second reinforcing member 22 which is arranged above the first reinforcing member 21, and a weld nut 23 (nut member) which is connected to the first and second reinforcing members 21, 22, respectively, and capable of engaging with the bolt 18.

The first reinforcing member 21 is configured to have a roughly U-shaped vertical cross section, and comprises a first lateral plate portion 21a which is arranged roughly horizontally, a second lateral plate portion 21b which is arranged below and in parallel to the first lateral plate portion 21a and has a longer longitudinal length than the first lateral plate portion 21a, and a vertical plate portion 21c which interconnects respective front end portions of the first and second lateral plate portions 21a, 21b. A rear end portion of the first lateral plate portion 21a is configured to be cut off in a roughly semicircular shape so as to engage with a front-side semicircular portion of a peripheral portion of the weld nut 23, and this semicircular portion 21d is joined to the front-side semicircular portion of the peripheral portion of the weld nut 23 by welding.

The second lateral plate portion 21b is configured in a roughly T shape in the plan view, and comprises a circular-shaped opening portion 21e which is formed at its central arear and into which the bolt 8 is inserted and a pair of right-and-left protrusion portions 21f which protrude outward, in the vehicle width direction, from its rear-end side portion. The second lateral plate portion 21b is arranged so as to face-contact the bottom plate portion 10a of the side member 10. The weld nut 23 is arranged vertically at an outer peripheral edge portion of the opening portion 21e. The pair of protrusion portions 21f are respectively joined to a bottom face of the second reinforcing member 22 by welding.

As shown in FIGS. 5-8, the second reinforcing member 22 is configured in a roughly L shape in the side view, and comprises an oblique-shaped front wall portion 22a which extends obliquely rearward and downward, a body portion 22b which is arranged above the first reinforcing member 21, and an oblique-shaped rear wall portion 22c which extends obliquely rearward and downward. The second reinforcing member 22 has a convex portion 22d which is provided at a central portion, in the vehicle width direction, of the second reinforcing member 22 to protrude upward and extend longitudinally over a range from a rear-end side portion of the front wall portion 22a to a front-end side portion of the rear wall portion 22c. The front wall portion 22a is configured such that its front-end side portion is interposed between the front end portion of the side member 10 and the slant portion 1b and joined to them by welding. The rear wall portion 22c is joined to the side member 10 which forms a rear portion of the closed cross section C at its rear-end side portion.

The body portion 22b is configured roughly horizontally, and comprises a circular opening portion 22e into which the weld nut 23 is inserted and a lightening hole 22f which is formed on the left side of the opening portion 22e. A rear-side semicircular portion 22g of the opening portion 22e is joined to the rear-side semicircular portion of the peripheral portion of the weld nut 23 by welding. The semicircular portion 21d and the semicircular portion 22g correspond to a roughly whole peripheral area of the weld nut 23 in the plan view. The weld nut 23 comprises a boss portion 23a which is placed on an peripheral edge portion of the opening portion 21e and partially arranged between the first lateral plate portion 21a and the second lateral plate portion 21b and a cylindrical body portion 23b which has a smaller diameter than the boss portion 23a.

Thereby, the suspension cross member 5 is moved back until the bolt 18 contacts the collar member 14 in an initial stage of the vehicle frontal collision. Then, the suspension cross member 5 has the bending deformation having the bending start point at the bead portion 5d. Further, in a case where the collision load acts, a moment to rotate the weld nut 23 counterclockwise through the bolt 18 with a support point at a contact portion of the attachment face portion 5a with the bottom plate portion 10a is generated. Herein, since a middle-level portion of the body portion 23b is supported, from a forward side, at the first lateral plate portion 21a, the compressive load acting on the semicircular portion 21d is supported at the second lateral plate portion 21b via the vertical plate portion 21c. Further, since an upper-side portion of the body portion 23b which is positioned above the middle-level portion is supported at the body portion 22b, the tensional load acting on the semicircular portion 22g is supported at the rear wall portion 22c. Accordingly, the timing of detachment of the suspension cross member 5 from the vehicle body when the weld nut 23 is pulled from the side member 10 is delayed.

Next, the operations and effects of the above-described lower vehicle-body structure will be described. According to the present lower vehicle-body structure, since the first reinforcing member 21 is joined to the front-side portion of the peripheral portion of the weld nut 23, when the collision load directed rearward acts on the suspension cross member 5 in the vehicle collision, the reaction force acting in the compressive direction to suppress the rotation of the bolt 18 can be generated, preventing a positional shift of the weld nut 23 relative to the first reinforcing member 21. Thereby, any local stress concentration can be prevented from occurring at the bottom plate portion 10a of the side member 10, so that the timing of detachment of the suspension cross member 5 from the vehicle body can be delayed, thereby making crush (collapsing) deformation of the suspension cross member 5 contribute to the collision-energy absorption performance.

Since the second reinforcing member 22 is provided in the closed cross section C which is formed by the side member 10 and the slant portion 1b and the second reinforcing member 22 is joined to the portion of the peripheral portion of the weld nut 23 which is different from the portion to which the first reinforcing member 21 is joined, the rotation of the bolt 18 can be suppressed by the first reinforcing member 21 and the second reinforcing member 22.

Since the second reinforcing member 22 is connected to the first reinforcing member 21, the first reinforcing member 21 is joined to the front-side semicircular portion of the peripheral portion of the weld nut 23, and the second reinforcing member 22 is joined to the rear-side semicircular portion of the peripheral portion of the weld nut 23, the reaction (force) acting in the compressive direction to suppress the rotation of the bolt 18 can be increased.

The first reinforcing member 21 comprises the first lateral wall portion 21a arranged roughly horizontally, the second lateral wall portion 21b arranged substantially in parallel to the first lateral wall portion 21a, and the vertical wall portion 21c connecting the respective front-side end portions of the first and second lateral wall portions 21a, 21b, and the rear-side end portion of the first lateral wall portion 21a has the cutout to engage with the front-side semicircular portion of the peripheral portion of the weld nut 23. Thereby, since the collision load acting on the first lateral wall portion 21a from the weld nut 23 is dispersed to the side member 10 by way of the second lateral wall portion 21b, the local stress concentration can be prevented from occurring at a seat area of the weld nut 23.

Next, modifications which are made by partially modify the above-described embodiment will be described.

1] While the above-described embodiment shows the example where the present invention is applied to the front-side suspension cross member, the present invention is applicable to a rear-side suspension cross member depending on a suspension type.

2] While the above-described embodiment also shows the example where the first reinforcing member is configured in the roughly U shape, the weld nut is seated vertically at the bottom plate portion of the side member via the first reinforcing member, the weld nut may be directly seated at the bottom plate portion of the side member as long as the reaction (force) acting in the compressive direction to suppress the rotation of the bolt can be generated. In this case, the front end portion of the first reinforcing member is joined to the front-side vertical wall portion of the lower-side first lateral wall portion, and the rear end portion of the first reinforcing member is joined to the front-side semicircular portion of the peripheral portion of the weld nut. Alternatively, the first reinforcing member is configured in the roughly U shape, and the rear end portion of the lower-side first lateral wall portion is joined to the front-side semicircular portion of the peripheral portion of the weld nut, and the upper-side second lateral wall portion is joined to the bottom portion of the second reinforcing member.

3] The present invention should not be limited to the above-described embodiment, and any other modifications or improvements may be applied within the scope of a spirit of the present invention.

What is claimed is:

1. A lower vehicle-body structure of a vehicle, which comprises a suspension cross member extending in a vehicle width direction and a support member fixed to a vehicle-body lower portion of a vehicle body, the suspension cross member being fixed to the support member by fastening a bolt member inserted through the suspension cross member to a nut member vertically fixed to a bottom plate portion of the support member, wherein a first reinforcing member which is supported at said support member is provided, and said first reinforcing member is joined to a portion of a peripheral portion of said nut member which is positioned on an opposite side to a cabin and wherein said first reinforcing member comprises a first lateral wall portion arranged roughly horizontally, a second lateral wall portion arranged substantially in parallel to said first lateral wall portion, and a vertical wall portion connecting respective end portions of said first and second lateral wall portions which are positioned on the opposite side to the cabin, and an end portion of the first lateral wall portion which is positioned on the side of the cabin has a cutout to engage with a semicircular portion of the peripheral portion of said nut member which is positioned on the opposite side to the cabin.

2. The lower vehicle-body structure of the vehicle of claim 1, wherein a second reinforcing member is provided in a closed cross section which is formed by said support member and the vehicle-body lower portion, and said second reinforcing member is joined to a portion of the peripheral portion of said nut member which is different from said portion to which the first reinforcing member is joined.

3. The lower vehicle-body structure of the vehicle of claim 2, wherein said second reinforcing member is connected to said first reinforcing member, said first reinforcing member is joined to a semicircular portion of the peripheral portion of the nut member which is positioned on the opposite side to the cabin, and said second reinforcing member is joined to a semicircular portion of the peripheral portion of the nut member which is positioned on a side of the cabin.

4. A lower vehicle-body structure of a vehicle, which comprises a suspension cross member extending in a vehicle width direction and a support member fixed to a vehicle-body lower portion of a vehicle body, the suspension cross member being fixed to the support member by fastening a bolt member inserted through the suspension cross member to a nut member vertically fixed to a bottom plate portion of the support member,
wherein a first reinforcing member which is supported at said support member is provided, and said first reinforcing member is joined to a vertically extending portion of said nut member only at a peripheral portion of said nut member positioned to one side of said nut member, and
wherein the second reinforcing member is provided in a closed cross section which is formed by said support member and the vehicle-body lower portion, and said second reinforcing member is joined to said vertically extending portion of said nut member only at a peripheral portion of said nut member positioned to another side of said nut member which is different from said portion to which the first reinforcing member is joined.

5. The lower vehicle-body structure of the vehicle of claim 4, wherein said second reinforcing member is connected to said first reinforcing member, said first reinforcing member is joined to a semicircular portion of the peripheral portion of the nut member, and said second reinforcing member is joined to a semicircular portion of the peripheral portion of the nut member.

6. The lower vehicle-body structure of the vehicle of claim 4, wherein said first reinforcing member comprises a first lateral wall portion arranged roughly horizontally, a second lateral wall portion arranged substantially in parallel to said first lateral wall portion, and a vertical wall portion connecting respective end portions of said first and second lateral wall portions, and an end portion of the first lateral wall portion has a cutout to engage with a correspondingly shaped portion of the peripheral portion of said nut member.

7. The lower vehicle-body structure of a vehicle according to claim 5, wherein a height along said vertically extending portion of said nut member of said portion where the second reinforcing member is joined is greater than a height along said vertically extending portion of said nut member of said portion where the first reinforcing member is joined.

8. A lower vehicle-body structure of a vehicle, which comprises a suspension cross member extending in a vehicle width direction and a support member fixed to a vehicle-body lower portion of a vehicle body, the suspension cross member being fixed to the support member by fastening a bolt member inserted through the suspension cross member to a nut member vertically fixed to a bottom plate portion of the support member,
wherein a first reinforcing member which is supported at said support member is provided, and said first reinforcing member is joined to a portion of a peripheral portion of said nut member only on a first side of said nut member toward the vehicle forward direction, and
wherein the second reinforcing member is provided in a closed cross section which is formed by said support member and the vehicle-body lower portion, and said second reinforcing member is joined to a portion of the peripheral portion of said nut member only on a second side of said nut portion opposite to said first side.

9. The lower vehicle-body structure of the vehicle of claim 8, wherein said second reinforcing member is connected to said first reinforcing member, said first reinforcing member is joined to a semicircular portion of the peripheral portion of the nut member, and said second reinforcing member is joined to a semicircular portion of the peripheral portion of the nut member.

10. The lower vehicle-body structure of the vehicle of claim 8, wherein said first reinforcing member comprises a first lateral wall portion arranged roughly horizontally, a second lateral wall portion arranged substantially in parallel to said first lateral wall portion, and a vertical wall portion connecting respective end portions of said first and second lateral wall portions, and an end portion of the first lateral wall portion has a cutout to engage with a correspondingly shaped portion of the peripheral portion of said nut member.

11. The lower vehicle-body structure of a vehicle according to claim 8, wherein a height along said nut member of said portion where the second reinforcing member is joined is greater than a height along said nut member of said portion where the first reinforcing member is joined.

* * * * *